United States Patent
Oumi

(10) Patent No.: US 10,532,460 B2
(45) Date of Patent: Jan. 14, 2020

(54) ROBOT TEACHING DEVICE THAT SETS TEACHING POINT BASED ON MOTION IMAGE OF WORKPIECE

(71) Applicant: FANUC CORPORATION, Yamanashi (JP)

(72) Inventor: Tatsuya Oumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 48 days.

(21) Appl. No.: 15/993,779

(22) Filed: May 31, 2018

(65) Prior Publication Data

US 2018/0354124 A1 Dec. 13, 2018

(30) Foreign Application Priority Data

Jun. 7, 2017 (JP) .................................. 2017-112707

(51) Int. Cl.
  *B25J 9/16* (2006.01)
  *G06T 1/00* (2006.01)
  *G06T 7/20* (2017.01)

(52) U.S. Cl.
  CPC ............ *B25J 9/163* (2013.01); *B25J 9/1664* (2013.01); *B25J 9/1697* (2013.01); *G06T 1/0014* (2013.01); *G06T 7/20* (2013.01); *G06T 2207/10028* (2013.01); *G06T 2207/20081* (2013.01); *G06T 2207/30164* (2013.01); *Y10S 901/03* (2013.01); *Y10S 901/31* (2013.01); *Y10S 901/47* (2013.01)

(58) Field of Classification Search
  USPC .................................................. 700/245-264
  See application file for complete search history.

(56) References Cited

U.S. PATENT DOCUMENTS

| | | | | |
|---|---|---|---|---|
| 5,748,854 A | * | 5/1998 | Watanabe | G05B 19/423 318/568.16 |
| 6,141,863 A | * | 11/2000 | Hara | B25J 9/1633 29/714 |
| 9,321,176 B1 | * | 4/2016 | Sun | B25J 9/1612 |
| 9,333,649 B1 | * | 5/2016 | Bradski | B25J 9/163 |
| 9,962,835 B2 | * | 5/2018 | Savarimuthu | B25J 9/1689 |
| 2005/0107920 A1 | * | 5/2005 | Ban | B25J 9/1692 700/245 |
| 2006/0069466 A1 | * | 3/2006 | Kato | B25J 9/1682 700/264 |
| 2007/0055406 A1 | * | 3/2007 | Tropf | G06K 9/00201 700/259 |

(Continued)

FOREIGN PATENT DOCUMENTS

| | | |
|---|---|---|
| CN | 1923470 A | 3/2007 |
| CN | 104875203 A | 9/2015 |

(Continued)

*Primary Examiner* — Jonathan L Sample
(74) *Attorney, Agent, or Firm* — Hauptman Ham, LLP

(57) ABSTRACT

A teaching device includes a motion image generating unit that generates a motion image in which a workpiece is moved, a position detecting unit that detects the grip position in which a hand grips, and a teaching-point setting unit that sets a teaching point. The position detecting unit detects the grip position on the workpiece when the motion image generating unit moves the workpiece in the motion image. The teaching-point setting unit sets the teaching point based on the grip position on the workpiece.

3 Claims, 7 Drawing Sheets

(56) References Cited

U.S. PATENT DOCUMENTS

| | | | | |
|---|---|---|---|---|
| 2007/0239315 | A1* | 10/2007 | Sato | B25J 9/1612 700/245 |
| 2008/0150891 | A1* | 6/2008 | Berkley | G06F 3/016 345/156 |
| 2011/0010009 | A1* | 1/2011 | Saito | B25J 9/1612 700/253 |
| 2011/0288667 | A1* | 11/2011 | Noda | B25J 9/1661 700/98 |
| 2012/0053728 | A1* | 3/2012 | Theodorus | G06K 9/00664 700/259 |
| 2013/0245824 | A1* | 9/2013 | Barajas | B25J 9/1664 700/253 |
| 2014/0016856 | A1* | 1/2014 | Jiang | G06T 7/40 382/153 |
| 2015/0290795 | A1* | 10/2015 | Oleynik | G05B 19/42 700/257 |
| 2015/0363034 | A1* | 12/2015 | Hinckley | G06F 3/0414 345/173 |
| 2015/0363035 | A1* | 12/2015 | Hinckley | G06F 3/0383 345/173 |
| 2016/0059412 | A1* | 3/2016 | Oleynik | B25J 9/163 700/257 |
| 2016/0127641 | A1* | 5/2016 | Gove | G06T 1/0007 348/143 |
| 2017/0027803 | A1* | 2/2017 | Agrawal | A61B 5/6828 |
| 2017/0252002 | A1* | 9/2017 | Mine | A61B 8/4218 |
| 2017/0270631 | A1* | 9/2017 | Melikian | G06T 1/0014 |
| 2018/0345483 | A1* | 12/2018 | Sirkett | B25J 9/1697 |

FOREIGN PATENT DOCUMENTS

| | | |
|---|---|---|
| CN | 106182020 A | 12/2016 |
| CN | 106239476 A | 12/2016 |
| EP | 1092513 A2 | 4/2001 |
| JP | 62-274404 A | 11/1987 |
| JP | H5-131385 A | 5/1993 |
| JP | 6-134684 A | 5/1994 |
| JP | H9-198121 A | 7/1997 |
| JP | 2001-105359 A | 4/2001 |
| JP | 2004-265041 A | 9/2004 |
| JP | 2005-111618 A | 4/2005 |

* cited by examiner

ROBOT TEACHING DEVICE THAT SETS TEACHING POINT BASED ON MOTION IMAGE OF WORKPIECE

RELATED APPLICATIONS

The present application claims priority of Japanese Application Number 2017-112707, filed on Jun. 7, 2017, the disclosure of which is hereby incorporated by reference herein in its entirety.

BACKGROUND OF THE INVENTION

1. Field of the Invention

The present invention relates to a robot teaching device that sets a teaching point based on a motion image of a workpiece.

2. Description of the Related Art

A robot is controlled so as to be driven in accordance with an operation program that is created in advance. The operation program can be created based on teaching points that are specified by an operator. The operator can set the teaching points by the manual operation of an actual robot. For example, the operator sets the robot to a desired position and a desired orientation by operating a teach pendant. At this time, the position of the tool center point of the robot can be stored as a teaching point in a controller.

In a known method, models of a workpiece and a robot are inputted to a calculator and the teaching points of the robot are set on a screen (For example, Japanese Unexamined Patent Publication No. 6-134684 and Japanese Unexamined Patent Publication No. 2004-265041). In the offline method of setting the teaching points, the teaching points can be set without moving the actual robot. The calculator can create the operation program of the robot such that the tool center point passes through or near the teaching points after the teaching points are set.

In offline teaching for robots, the method for checking whether or not an abnormality will occur by using an animation when a robot is moved based on a created robot operation program is known (For example, Japanese Unexamined Patent Publication No. 2001-105359 and Japanese Unexamined Patent Publication No. 62-274404).

SUMMARY OF INVENTION

In the offline teaching method according to the related art, it is necessary to set the teaching points of the robot one by one according to the motion of the robot. Accordingly, there is a problem that it takes a long time to set the teaching points of the robot. Moreover, if a hand for gripping the workpiece is changed, the grip position of the hand on the workpiece is also changed. Thus, if the hand is changed, it is necessary to set the teaching points from the beginning.

A robot teaching device according to an aspect of the present disclosure sets a teaching point of a robot that grips and moves a workpiece. The robot teaching device includes a motion image generating unit that generates a three-dimensional motion image in which the workpiece moves. The robot teaching device includes a position detecting unit that detects the grip position in which a hand attached to the robot grips on the workpiece displayed in the motion image and a teaching-point setting unit that sets the teaching point. The relationship between the grip position on the workpiece and the teaching point is determined in advance. When the motion image generating unit moves the workpiece in the motion image, the position detecting unit detects the grip position on the workpiece. The teaching point setting unit sets the teaching point based on the grip position.

DETAILED DESCRIPTION

Referring to FIGS. 1 to 7, a robot teaching device according to an embodiment will be described below. The robot device according to the present embodiment is formed so as to grip and move a workpiece. The teaching device of the present embodiment sets the teaching points of the robot by offline.

Figure 1:
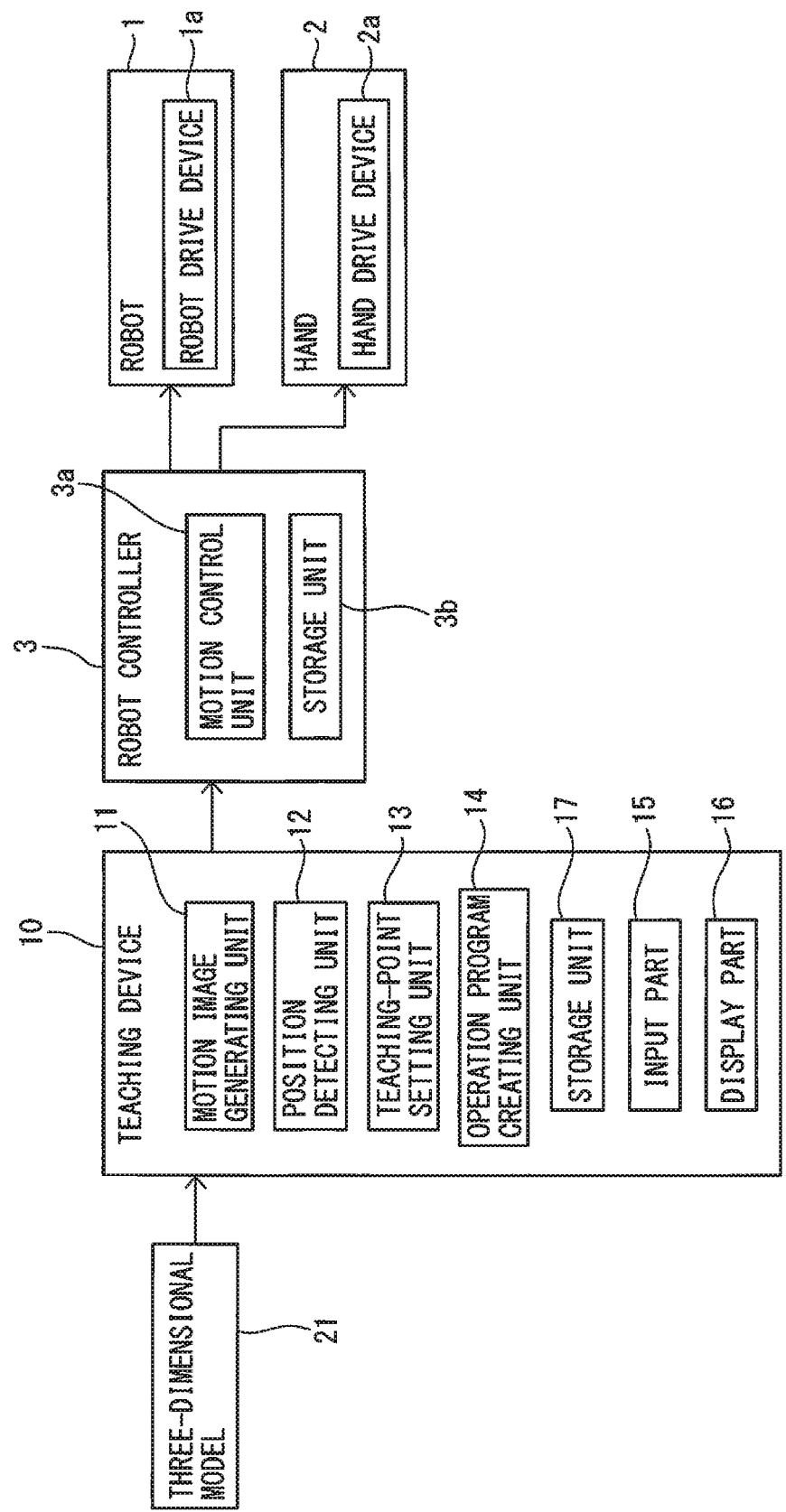
FIG. 1 is a block diagram of a robot system according to an embodiment.

FIG. 1 is a block diagram showing a robot system according to the present embodiment. The robot device of the present embodiment includes a hand 2 that grips the workpiece and a robot 1 that moves the hand 2. The robot 1 of the present embodiment is an articulated robot that has a plurality of joints. The robot 1 includes a robot drive device 1a that has motors for driving an arm and a wrist part. The robot 1 is not limited to this configuration. Any robot that can move the hand 2 may be used instead.

The hand 2 is formed so as to grip the workpiece. The hand 2 of the present embodiment grips the workpiece by suction. The hand 2 includes a hand drive device 2a having a pump or the like that drives the hand 2. The hand 2 may be any operation tool that is capable of gripping the workpiece. For example, the hand 2 may be a hand that has multiple finger parts and holds the workpiece by the multiple finger parts, a hand that has a hook engaging with a hole formed in the workpiece, or the like.

The robot device includes a robot controller 3. The robot controller 3 is composed of an arithmetic processing unit (calculator) including a CPU (Central Processing Unit) that acts as a processor, and a RAM (Random Access Memory) and a ROM (Read-Only Memory) that are connected to the CPU via a bus. An operation program for performing the operation of the robot 1 is inputted to the robot controller 3. The robot controller 3 includes a storage unit 3b that stores the operation program or the like. The robot controller 3 includes a motion control unit 3a that transmits a motion command for driving the robot 1 and the hand 2 based on the operation program. The motion control unit 3a transmits the motion command for driving the robot drive device 1a and the hand drive device 2a. The robot drive device 1a and the hand drive device 2a are driven according to the motion command.

The robot system of the present embodiment includes a teaching device 10 that sets the teaching points of the robot 1. The teaching device 10 of the present embodiment has the function of setting the teaching points and the function of creating the operation program of the robot 1 based on the set teaching points.

The teaching device 10 is composed of an arithmetic processing unit (calculator) that includes a CPU, a RAM, and a ROM. The teaching device 10 includes a storage unit 17 that stores information on the setting of the teaching points and the operation program. The teaching device 10 includes an input part 15 with which the operator inputs any information. The input part 15 may include a keyboard or a mouse. The input part 15 is formed so as to obtain information in response to an operation performed on, for example, a keyboard by the operator. The input part 15 may be formed so as to obtain information from an external device through a communication device. The teaching device 10 includes a display part 16 that displays, for example, the information on the setting of the teaching points or the operation program. The display part 16 may include an arbitrary display panel, e.g., a liquid crystal display panel.

The teaching device 10 of the present embodiment includes a motion image generating unit 11 that generates a motion image in which the workpiece and the robot 1 move. The teaching device 10 includes a position detecting unit 12 that detects the grip position in which the hand 2 grips on the workpiece displayed in the motion image. The position detecting unit 12 detects the grip position on the workpiece when the motion image generating unit 11 moves the workpiece in the motion image. Moreover, the teaching device 10 includes a teaching-point setting unit 13 that sets the teaching points based on the grip position on the workpiece.

Figure 2:
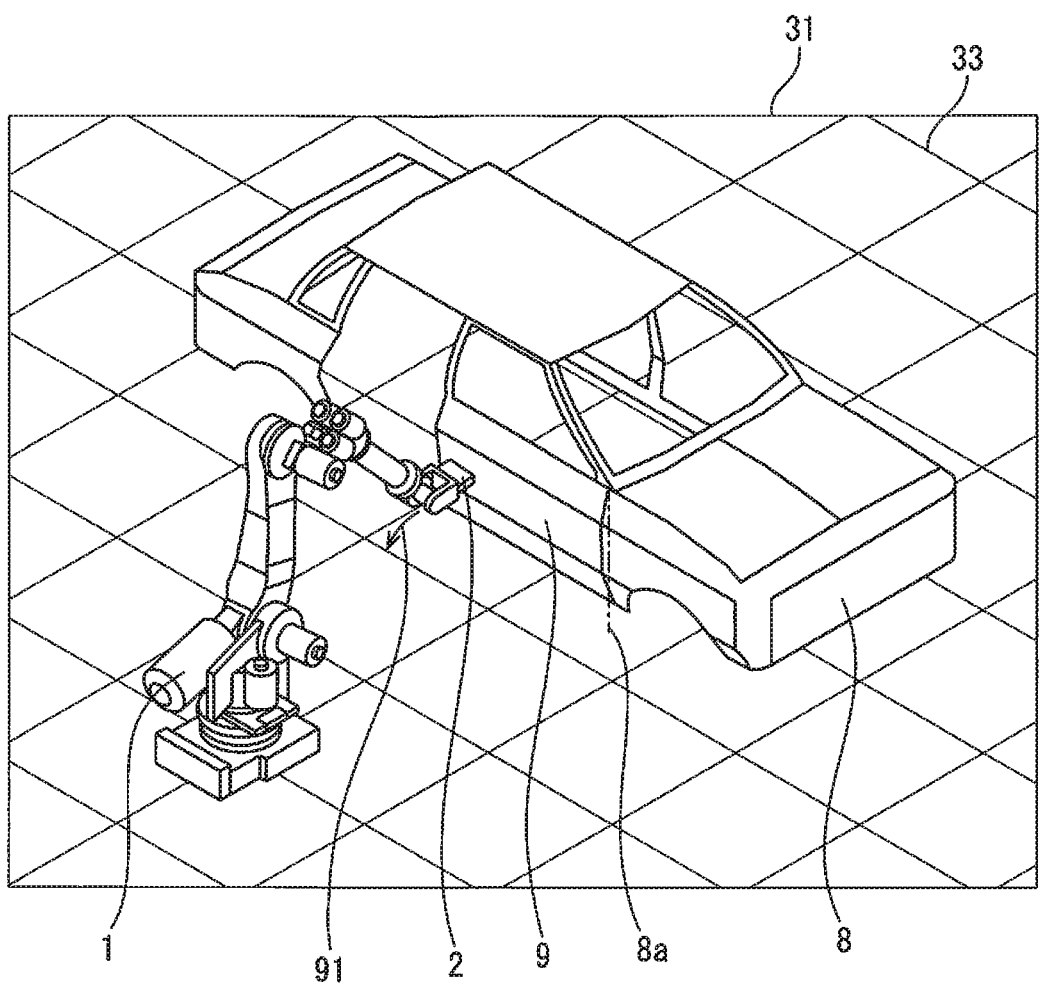
FIG. 2 shows first image displayed on the display part of a teaching device.

FIG. 2 shows first image displayed on the display part of the teaching device. In the present embodiment, a vehicle body 8 of an automobile is illustrated as the workpiece. Referring to FIG. 1 and FIG. 2, an image 31 is displayed on the screen of the display part 16. The image 31 includes the body 8, the robot 1, and the hand 2 in addition to auxiliary lines 33. The robot device performs an operation for opening a door 9 of the body 8. The door 9 can pivot about a rotary axis 8a. The motion of the door 9 of the present embodiment is determined in advance. In other words, the movement path of a predetermined point on the door 9 is determined in advance.

The hand 2 of the present embodiment grips an end part of the door 9 by suction. The position and orientation of the robot 1 are changed so as to move the hand 2 in the direction indicated by arrow 91, thereby opening the door 9. The teaching device 10 of the present embodiment sets the teaching points of the robot 1 when the door 9 is opened.

Figure 3:
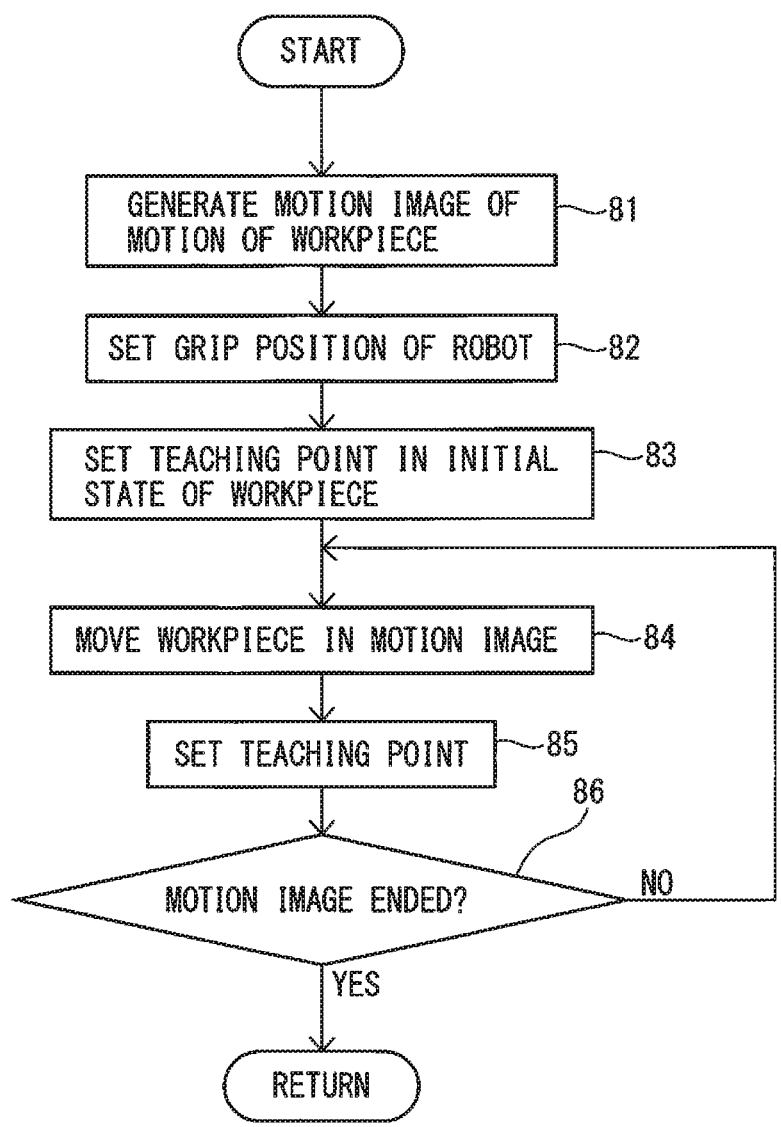
FIG. 3 is a flowchart of control for setting teaching points according to the embodiment.

FIG. 3 shows a flowchart of a control when the teaching device sets the teaching points. Referring to FIGS. 1 to 3, the operator inputs a three-dimensional model 21 of the vehicle body 8 including the door 9 to the teaching device 10 in advance. Moreover, the operator inputs the three-dimensional models 21 of the robot 1 and the hand 2 in advance. For the three-dimensional models, for example, three-dimensional data of the shapes that are created by a CAD (Computer-Aided Design) device can be used. Alternatively, the teaching device 10 may acquire a three-dimensional model that is stereoscopic model by capturing an image of, for example, the actual vehicle body 8 with a three-dimensional camera. Alternatively, the teaching device 10 may form a three-dimensional model in the teaching device 10 by using a plurality of two-dimensional drawing data created by, for example, a CAD device. The storage unit 17 stores the inputted three-dimensional models 21.

Figure 4:
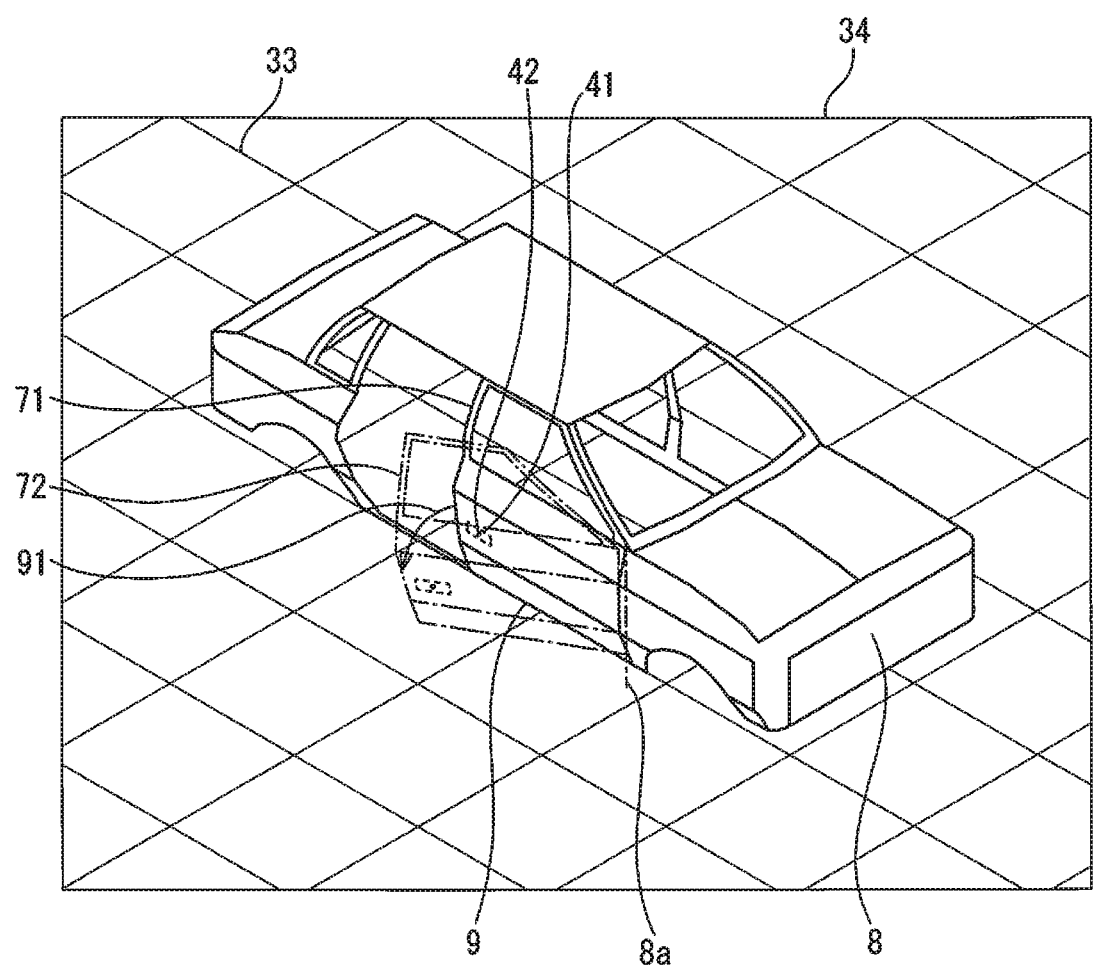
FIG. 4 shows second image for explaining a motion image of a vehicle body displayed on the display part of the teaching device.

FIG. 4 shows second image for explaining the motion image when the door of the vehicle body is moved. The motion image generating unit 11 displays an image 34 of the vehicle body 8. At this time, the image of the robot 1 is not displayed. The operator specifies a position 71 of the closed door 9 and a position 72 of the opened door 9. The position 71 is the position in which the motion of the workpiece is started. The position 72 is the position in which the motion of the workpiece is ended. At this time, the operator can input information on the opening speed of the door 9. For example, the operator can set a time from a closed state to an opened state of the door 9.

Referring to FIGS. 3 and 4, in step 81, the motion image generating unit 11 of the teaching device 10 generates a three-dimensional motion image in which the workpiece moves. The motion image generating unit 11 generates a motion image (animation) in which the door 9 of the vehicle body 8 is moved based on the three-dimensional model 21 of the vehicle body 8. The motion image generating unit 11 can generate the motion image according to any method of generating three-dimensional animation. For example, the motion image generating unit 11 generates the motion image of five frames per second. The motion image generating unit 11 generates the motion image of the door 9 that opens from the position 71 to the position 72. In the image 34, the motion image of the door 9 can be displayed continuously from a closed state to an opened state as indicated by the arrow 91.

Subsequently, in step 82, the operator specifies the grip position of the hand 2 on the door 9. While the door 9 is closed, the operator specifies the grip position 42 in the image 34 by the operation of a mouse. Furthermore, the operator specifies a grip region 41 that is a region for gripping the door 9 by the hand 2. The orientation of the grip region 41 corresponds to the orientation of the hand 2. The grip position 42 can be set in the grip region 41.

The grip position 42 and the grip region 41 on the workpiece are not always specified by the operator through the teaching device 10. The three-dimensional model 21 may include information on the grip position 42 and information on the grip region 41.

Figure 5:
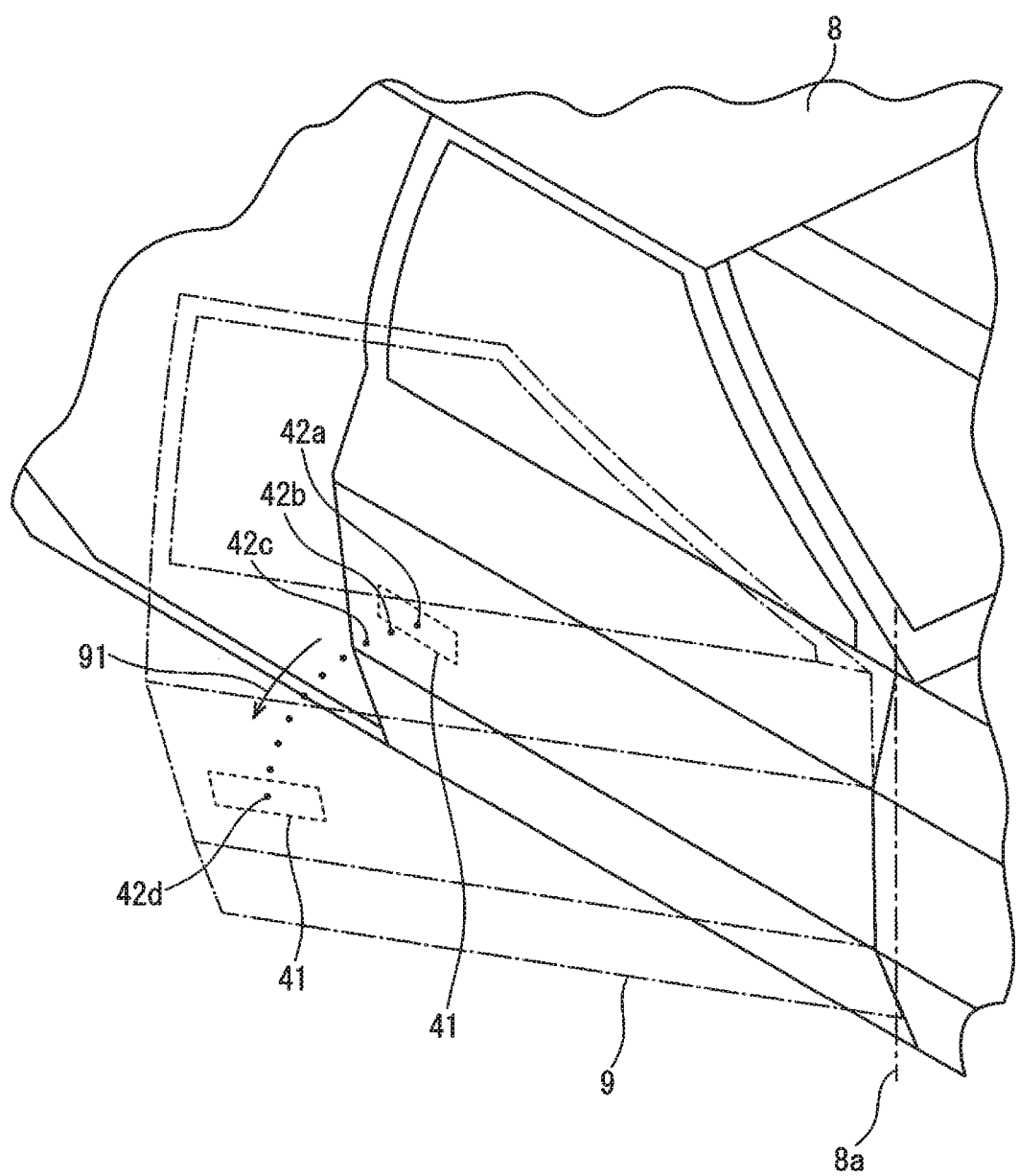
FIG. 5 is an enlarged perspective view of a door for explaining the movement of a grip position.

FIG. 5 shows an enlarged perspective view for explaining the state of the door when the position detecting unit detects the grip position. Referring to FIGS. 3 and 5, in step 83, the teaching device 10 starts the setting of a teaching point. First, in an initial state where the door 9 is closed, the position detecting unit 12 detects a grip position 42a. For example, the position detecting unit 12 detects the coordinate values of the grip position 42a in a predetermined coordinate system. The detection of the grip position 42a includes the detection of the orientation of the workpiece. The position detecting unit 12 detects the orientation of the workpiece at the grip position 42a. The orientation of the workpiece may be, for example, the direction that relates to the surface of the grip region 41. The orientation of the workpiece may be perpendicular to the grip region 41 at the grip position 42a.

The relationship between the grip position 42a on the door 9 and the teaching point of the robot 1 is determined in advance. The grip position 42a corresponds to the position of the tool center point of the hand 2. The position of the teaching point can be set at, for example, a point that is separated from the grip position 42a by a predetermined distance in a direction perpendicular to the grip region 41.

For example, the teaching-point setting unit 13 calculates the coordinate value of the tool center point in the predetermined coordinate system. Moreover, in the setting of the teaching point, the setting of the orientation of the hand 2 is included. The teaching-point setting unit 13 can set the orientation of the hand 2 based on the orientation of the workpiece detected by the position detecting unit 12. The teaching-point setting unit. 13 can set the teaching point of the initial state in which the door 9 is closed based on the grip position 42*a* and the orientation of the grip region 41.

Subsequently, in step 84, the motion image generating unit 11 moves the door 9 in the direction of arrow 91. The motion amount of the door 9 according to the present embodiment is determined at the predetermined time intervals. The motion image generating unit 11 moves the door 9 in the direction in which the door is opened in the predetermined time. In this case, the motion image generating unit 11 moves the door 9 from the grip position 42*a* to the grip position 42*b* based on the time of a single operation.

In step 85, the position detecting unit 12 detects the grip position 42*b* based on the state of the door 9 after movement. The grip position moves along a movement path based on the motion of the door 9. The teaching-point setting unit 13 sets the teaching point corresponding to the grip position 42*b*.

Subsequently, in step 86, the teaching-point setting unit 13 determines whether or not the motion image has ended. If the motion image has not ended, the control proceeds to step 84. In step 84, the motion image generating unit 11 opens the door 9 in a predetermined time length. In this case, the motion image generating unit 11 moves the door 9 from the grip position 42*b* to a grip position 42*c* based on the time of a single operation. The position detecting unit 12 detects the grip position 42*c* based on the state of the door 9 after movement. In step 85, the teaching-point setting unit 13 sets a teaching point based on the grip position 42*c*.

In this way, the teaching device 10 can set the teaching point corresponding to the grip position 42 based on the grip position 42 at that time while moving the door 9 in each predetermined section in the animation. The setting of the teaching point is repeated until the end of the motion image. In other words, the setting of the teaching point is repeated until the motion of the door 9 is ended. In FIG. 5, the setting of the teaching point is repeated until a teaching point that corresponds to a grip position 42*d* is set at the end of the motion of the door 9. In step 86, the control is terminated when the motion image is ended.

As described above, the teaching device of the present embodiment can set multiple teaching points by using the motion image of the workpiece. The set teaching points are stored in the storage unit 17. Information on the teaching points includes information on the orientations of the hand 2.

In the present embodiment, the teaching points are set at the predetermined time intervals while the door 9 is moved, but the embodiment is not limited to this. The teaching points can be set at any intervals. For example, the teaching point may be set each time the workpiece is moved by a predetermined distance.

Moreover, in the present embodiment, the teaching points are set at predetermined intervals, but the embodiment is not limited to this. While the motion image generating unit 11 moves the workpiece, the position detecting unit. 12 can detect the grip positions on the workpiece at the predetermined intervals and store the grip positions in the storage unit 17. After the completion of the motion of the workpiece in the motion image, the teaching-point setting unit 13 may set a plurality of the teaching points based on the information on a plurality of the grip positions that are stored in the storage unit 17.

Thereafter, an operation program creating unit 14 of the teaching device 10 creates the operation program based on the set teaching points. The information on the teaching points includes the positions of the teaching points and the orientations of the hand 2. The operation program creating unit 14 can set the positions and orientations of the hand 2 based on the information on the teaching points. The operation program creating unit 14 can set the position and orientation of the robot 1 based on the position and orientation of the hand 2. For example, the operation program creating unit 14 can calculate the position and orientation of the robot 1 according to inverse kinematics. The operation program creating unit 14 can create the operation program based on the position and orientation of the robot. In this way, the operation program creating unit 14 can create the operation program according to the motion of the door 9.

Figure 6:
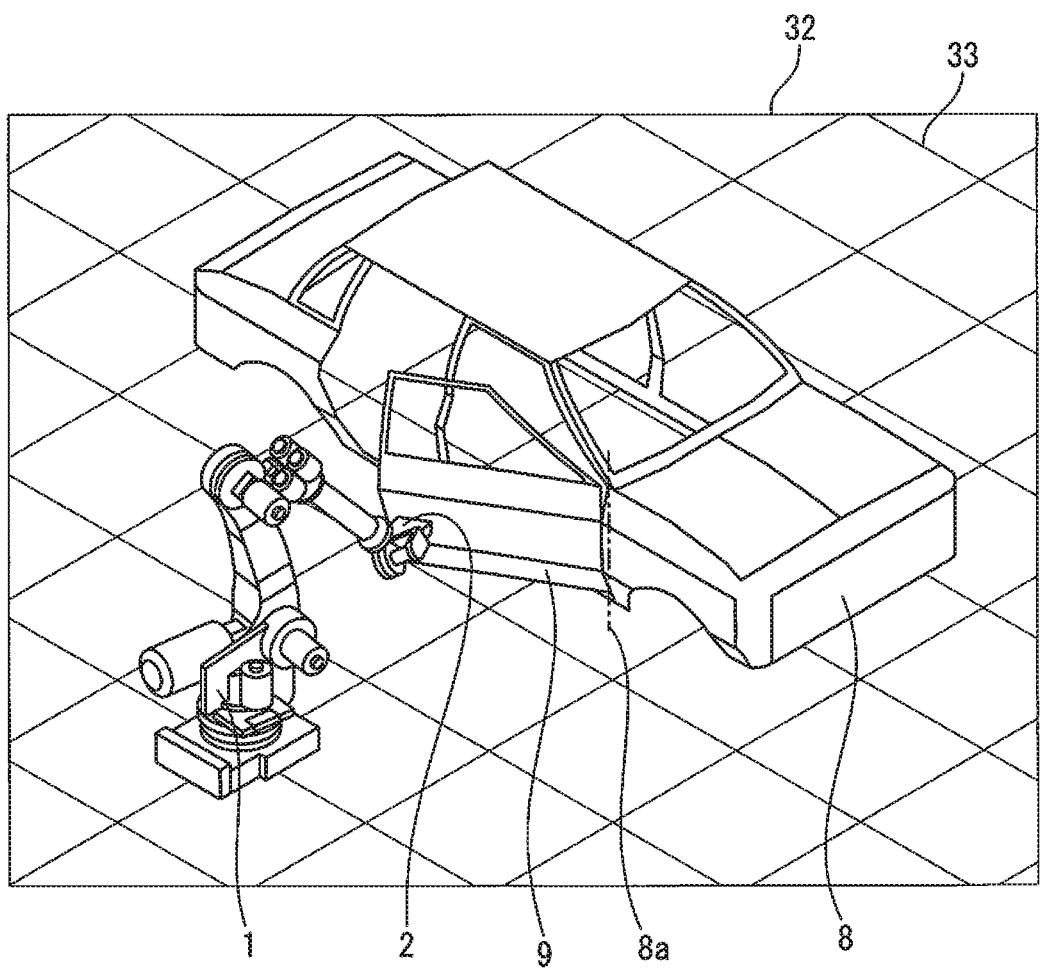
FIG. 6 is third image displayed on the display part of the teaching device.

FIG. 6 shows third image displayed on the display part of the teaching device. FIG. 6 is an image 32 showing the state of the robot and the workpiece when the door is opened. The motion image generating unit 11 of the teaching device 10 is formed so as to display the motion of the robot 1 as a motion image in addition to the motion of the door 9. In the motion image including the robot 1, the hand 2, and the vehicle body 8, the image 31 in FIG. 2 is displayed so as to continuously change to the image 32 of FIG. 6. Furthermore, the operator can confirm whether or not the motion of the robot 1 and the motion in which the door 9 is opened are normal.

At this time, the drive speed of the robot 1 is determined according to the opening speed of the door 9, which is initially specified by the operator. If the drive speed of the robot 1 is too high or low, the drive speed of the robot 1 may be corrected.

In this way, the teaching device 10 can create the operation program. The operation program that is created by the teaching device 10 is transmitted to the robot controller 3. The robot controller 3 can drive the robot 1 and the hand 2 based on the operation program.

In the teaching device 10 of the present embodiment, the positional relationship between the hand 2 and the door 9 is determined in advance. In the teaching device 10, the robot 1 is not moved on the screen but the door 9 serving as the workpiece is moved. While the door 9 is moved in the motion image, the teaching points can be automatically set. In the teaching device 10 of the present embodiment, the operator may set the motion of the workpiece that is easily understood through instinct, for example, the motion in which the door 9 is opened. The teaching device 10 automatically sets the teaching points based on the motion of the workpiece. Thus, the operator does not need to consider a complicated motion of the robot and the teaching points can be set easily.

If the type or size of the hand 2 attached to the robot 1 is changed, the operation program needs to be changed. In this case, when the operator sets the grip position and the grip region of the hand by using the three-dimensional model of the workpiece that is inputted in advance, the teaching device 10 sets the teaching points. Since the operator does not need to set the teaching points one by one from the beginning, the operator can easily set the teaching points.

The motion of the door 9 of the present embodiment is determined in advance. In other words, it is determined that the door 9 of the vehicle body 8 moves in the direction that pivots about the rotary axis 8*a*. The motion image generating unit 11 can move the workpiece in the predetermined direction in the motion image and the teaching-point setting unit 13 can set the teaching points at the predetermined intervals. When the operator specifies a state where the motion of the workpiece is started and a state where the motion of the workpiece is ended, the teaching device 10 creates the teaching points of the robot. Thus, the operator can easily set the teaching points.

In the above embodiment, the workpiece makes a predetermined motion, but the embodiment is not limited to this. The motion of the workpiece may not be determined in advance. The teaching device of the present embodiment is applicable to any robot system that moves the workpiece.

Figure 7:
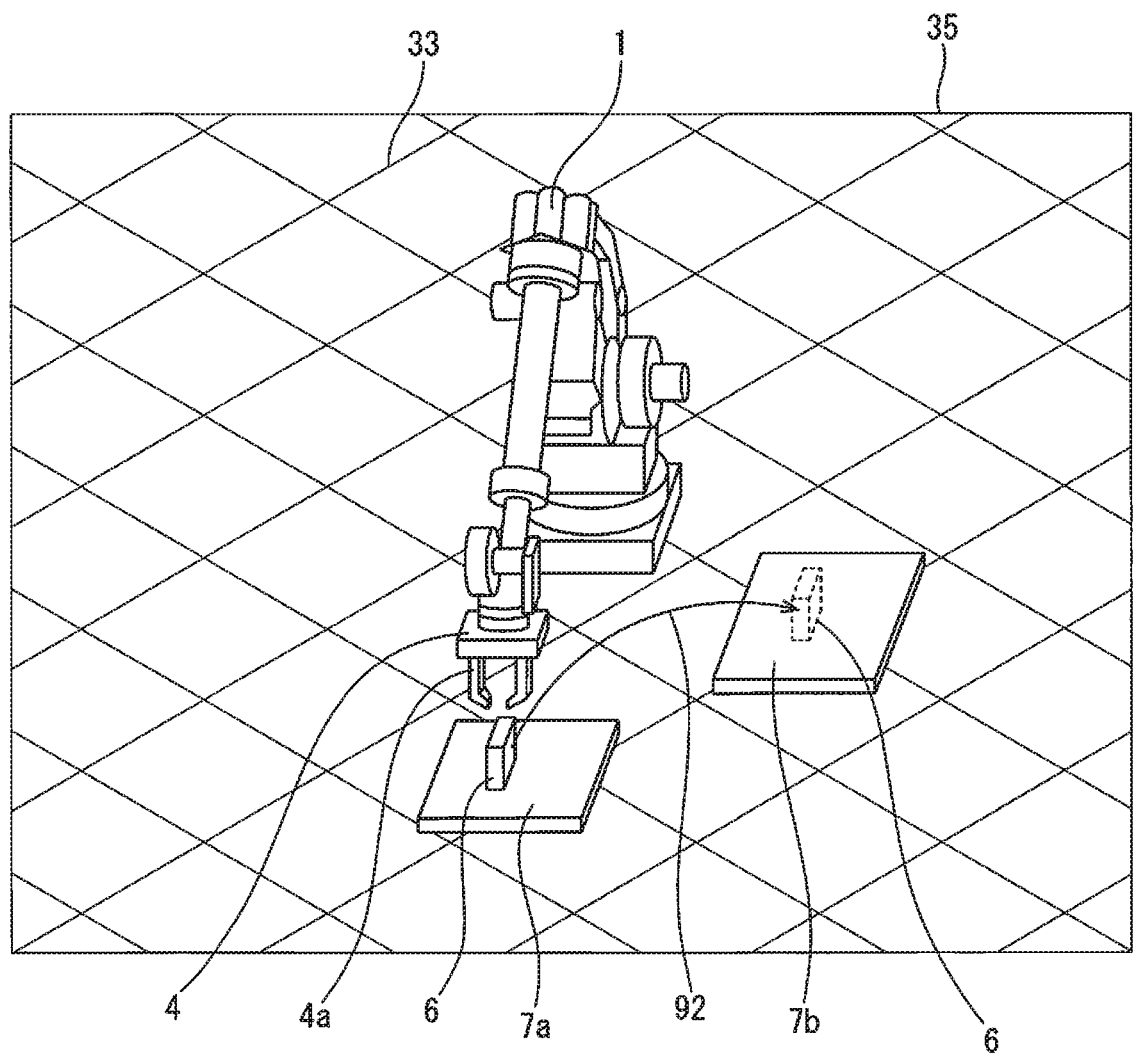
FIG. 7 is an image of another robot device displayed on the display part of the teaching device.

FIG. 7 shows an image of another robot device that is displayed on the display part of the teaching device. In an image 35, the robot device for moving a workpiece is displayed. A hand 4 that has a plurality of finger parts 4a is attached to the robot 1. The robot 1 transfers a box. 6 serving as a workpiece from a pedestal 7a to a pedestal 7b. In this robot device, the motion of the workpiece is not determined in advance and the workpiece is movable along any path. In this example, the robot 1 transfers the box 6 along a movement path indicated by arrow 92.

The operator can optionally set the movement path of the box 6 and the orientation of the box 6 on the screen, while the position and orientation of the robot 1 is not taken into account. A method of moving the box 6 can be specified on the screen by the operator. For example, the operator moves the box 6 on the screen with the mouse so as to set the state of the box 6 that moves from a motion start position on the pedestal 7a to a motion end position on the pedestal 7b. Alternatively, the operator may specify the movement path of the box 6 and the orientation of the box 6 according to, for example, the coordinate values of the predetermined coordinate system. The teaching device 10 generates a motion image in which the box 6 is moved based on the movement path of the box 6 and the orientation of the box 6. Furthermore, the teaching device 10 can automatically set teaching points based on the motion image of the box 6.

In another example, the teaching device of the present embodiment is applicable to a robot system in which a tray is removed from a shelf by a robot device and is moved to a predetermined location. The operator may specify the movement path of the tray and the orientation of the tray when the tray is removed from the shelf while the position and orientation of the robot is not taken into account. Also in this case, the teaching device creates a motion image in which the tray is moved based on the movement path and orientation of the tray. The teaching device can set teaching points based on the motion image.

Furthermore, the teaching device of the present embodiment is applicable to a robot system that performs an operation for assembling a device. For example, the teaching device of the present embodiment is applicable to a robot system that performs an operation for inserting an electronic part into a substrate transferred by a conveyor. The operator sets the movement path of the electronic part and the orientation of the electronic part on the screen. The teaching device can create a motion image in which the electronic part is moved and set teaching points based on the motion image.

In the embodiment, the position detecting unit detects the grip position on the workpiece at the predetermined intervals based on the motion image of the workpiece, but the embodiment is not limited to this. For example, the operator may set the time in which the grip position of the hand is detected on the screen while the operator watches the motion image of the workpiece.

The robot teaching device according to an aspect of the present disclosure can easily set teaching points of the robot that grips and moves the workpiece.

In the foregoing steps of control, the order of steps can be optionally changed unless the function and effect are changed.

The above embodiments can be combined as deemed appropriate. In the drawings, the same or equivalent parts are indicated by the same symbols. The embodiment is merely exemplary and does not limit the invention. The embodiment includes the modifications indicated in the claims.

The invention claimed is:

1. A teaching device of a robot for setting a teaching point of a robot that grips and moves a workpiece, the teaching device comprising:
    a motion image generating unit that generates a three-dimensional motion image in which the workpiece is moved;
    a position detecting unit that detects a grip position in which a hand attached to the robot grips on the workpiece displayed in the motion image; and
    a teaching-point setting unit that sets the teaching point; wherein
    a relationship between the grip position on the workpiece and the teaching point is determined in advance,
    the position detecting unit detects the grip position on the workpiece when the motion image generating unit moves the workpiece in the motion image, and
    the teaching-point setting unit sets the teaching point based on the grip position.

2. The robot teaching device according to claim 1, wherein the position detecting unit detects grip positions at predetermined intervals based on the motion image of the workpiece.

3. The robot teaching device according to claim 1, wherein a motion of the workpiece is determined in advance, and
    the motion image generating unit generates the motion image of the workpiece based on a position of the workpiece at start of the motion and a position of the workpiece at end of the motion that are set by an operator.

* * * * *